(12) United States Patent
Jiang et al.

(10) Patent No.: US 10,487,240 B2
(45) Date of Patent: Nov. 26, 2019

(54) SILICONE BASED EMULSION, METHOD FOR MAKING SAME, AND WATERBORNE CO-BINDER RESIN COMPOSITIONS COMPRISING SUCH EMULSIONS

(71) Applicant: Momentive Performance Materials Inc., Waterford, NY (US)

(72) Inventors: Ping Jiang, New York, NY (US); Louisa Maio, White Plains, NY (US); Vikram Kumar, Tarrytown, NY (US); Martin Wusik, Danbury, CT (US); Yogesh Tiwary, Bangalore (IN); Michael Seeber, New York, NY (US)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 276 days.

(21) Appl. No.: 15/204,379

(22) Filed: Jul. 7, 2016

(65) Prior Publication Data

US 2017/0009099 A1  Jan. 12, 2017

Related U.S. Application Data

(60) Provisional application No. 62/190,464, filed on Jul. 9, 2015, provisional application No. 62/275,989, filed on Jan. 7, 2016.

(51) Int. Cl.

| | | |
|---|---|---|
| *C09D 183/04* | (2006.01) | |
| *C08L 83/04* | (2006.01) | |
| *C09D 133/08* | (2006.01) | |
| *C08K 3/36* | (2006.01) | |
| *C09D 7/63* | (2018.01) | |
| *C08G 77/16* | (2006.01) | |
| *C08K 5/17* | (2006.01) | |

(52) U.S. Cl.
CPC .............. *C09D 183/04* (2013.01); *C08K 3/36* (2013.01); *C08L 83/04* (2013.01); *C09D 7/63* (2018.01); *C09D 133/08* (2013.01); *C08G 77/16* (2013.01); *C08K 5/17* (2013.01)

(58) Field of Classification Search
CPC .... C08G 77/16; C09D 133/08; C09D 183/04; C09D 7/63; C08L 83/04; C08K 3/36; C08K 5/17
USPC ........................................................ 524/247
See application file for complete search history.

(56) References Cited

U.S. PATENT DOCUMENTS

| | | |
|---|---|---|
| 4,069,178 A | 1/1978 | Mikami |
| 4,221,688 A | 9/1980 | Johnson |
| 4,962,153 A | 10/1990 | Liles |
| 5,852,095 A | 12/1998 | Yamauchi |

OTHER PUBLICATIONS

Kudo, Shin-Ichi et al. "Aqueous dispersions of polysiloxane-acrylic hybrid resins for coatings," Mar. 28-30, 2000, Dainippon Ink &Chemicals, Paper 31 in Silicones in Coating III, Barcelona, Spain.

*Primary Examiner* — Angela C Scott
(74) *Attorney, Agent, or Firm* — James Abruzzo; McDonald Hopkins LLC

(57) ABSTRACT

A crosslinkable silicone based emulsion composition includes a hydroxylated polydiorganopolysiloxane grafted onto at least one colloidal silica dispersion, wherein the at least one hydroxylated polydiorganopolysiloxane grafted onto the least one colloidal silica dispersion contains residual silanol groups from the at least one hydroxylated polydiorganopolysiloxane. Further, a waterborne co-binder silicone-organic resin composition includes (A) the crosslinkable silicone emulsion and (B) an organic resin emulsion which provides improved cured properties including, but not limited to, improved hydrophobicity (water resistance), scratch resistance and gloss retention as well as process for making the emulsions and the compositions.

28 Claims, No Drawings

SILICONE BASED EMULSION, METHOD FOR MAKING SAME, AND WATERBORNE CO-BINDER RESIN COMPOSITIONS COMPRISING SUCH EMULSIONS

CROSS-REFERENCE TO RELATED APPLICATIONS

The present application claims priority to and the benefit of U.S. Provisional Application No. 62/190,464 entitled "Silicone Based Emulsion, Method for Making Same, and Waterborne Co-Binder Resin Compositions Comprising Such Emulsions," filed on Jul. 9, 2015, and to U.S. Provisional Application No. 62/275,989 entitled "Silicone Based Emulsion, Method for Making Same, and Waterborne Co-Binder Resin Compositions Comprising Such Emulsions," filed on Jan. 7, 2016, the disclosures of which are each incorporated herein by reference in their entirety.

FIELD

The present technology generally relates to a silicone emulsion, methods of making such emulsions, and the use of such emulsions as a co-binder in organic resin compositions, particularly organic resin compositions which are latex compositions.

BACKGROUND

Coatings for exterior applications require good weather resistance. When an aqueous acrylate polymer emulsion obtained by emulsion polymerization is dried at room temperature or elevated temperature conditions, a coating is obtained that has acceptable durability. Because dried acrylate polymers have good durability, aqueous acrylate polymer emulsions are widely used as a resin for aqueous paints. However, when a coating obtained from an acrylate polymer emulsion or from a paint comprising an acrylate polymer emulsion having a pigment incorporated therein is exposed to outdoor conditions or ultraviolet light, not only is the luster of the coating likely to be rapidly deteriorated, but the coatings also have poor gloss retention and poor water resistance.

Silicones have been used to improve weather resistance of organic resin compositions. For an example, modification of alkyd and acrylic resins with silicones improve their durability in solvent-borne coatings for exterior applications. Concerns about volatile organic compound (VOC) emissions have prompted the development of waterborne analogues. However, it is often difficult to introduce silicone materials into waterborne organic resin compositions because the silicones are incompatible and/or immiscible with waterborne organic resin compositions. Typically, very small amounts of silicones are used as additives. Consequently, silicone materials used as additives are normally not crosslinked gels or elastomeric compounds. Rather, the silicone materials used as additives are silicone oils and silicone resins. Silicone oils and resins typically are not compatible with waterborne organic resins when large amounts are added. To incorporate silicone materials into waterborne organic resins, functional silicone intermediate materials have been used to first chemically modify organic resins and then to emulsify these modified organic resins. The use of silicone oils and resins requires multiple processing steps including resin synthesis and emulsification, which are not easy to practice and adds costs to the final modified organic resin emulsion.

Therefore there is still a need for an additive which improves the hydrophobicity (water resistance), scratch resistance and gloss retention of waterborne organic resin, especially after exposure to environmental aging conditions.

SUMMARY

Accordingly, the present invention provides waterborne co-binder silicone-organic resin compositions in which a crosslinkable silicone based emulsion is one of the components. The crosslinkable silicone based emulsion may be used in a waterborne organic resin composition to provide the resin with improved properties including, but not limited to, improved hydrophobicity (water resistance), scratch resistance and gloss retention.

In one aspect, the present invention provides a waterborne co-binder silicone-organic resin composition comprising (A) a crosslinkable silicone based emulsion comprising the reaction product of (i) a hydroxyl terminated silicone with (ii) a colloidal silica to form a crosslinkable silicone moiety, and (iii) a catalyst, (iv) an emulsion stabilizer and (v) surfactant; and (B) an organic resin emulsion comprising surfactant and organic resin.

The present invention also provides a method for making such crosslinkable silicone based emulsions.

In one aspect, the present invention provides a process for forming a crosslinkable silicone emulsion comprising providing a silicone emulsion composition comprising a hydroxylated polydiorganosiloxane, a colloidal silica, water, an ionic or an anionic surfactant, an emulsion stabilizer and a catalyst, and heating the silicone emulsion composition at a temperature of from about 40° C. to about 100° C. for about 1 to about 72 hours to form a crosslinkable silicone emulsion.

In still another aspect, the present invention provides a crosslinkable silicone based emulsion composition comprising: at least one hydroxylated polydiorganopolysiloxane grafted onto at least one colloidal silica dispersion; at least one catalyst; at least one emulsion stabilizer; at least one surfactant; and water, wherein the at least one hydroxylated polydiorganopolysiloxane grafted onto the at least one colloidal silica dispersion contains residual silanol groups from the at least one hydroxylated polydiorganopolysiloxane.

In one embodiment, the composition further comprises at least one organic resin.

In one embodiment of the composition of any previous embodiment, the at least one surfactant is a non-ionic surfactant, an anionic surfactant, or a combination thereof.

In one embodiment of the composition of any previous embodiment, the hydroxylated polydiorganosiloxane has a weight average molecular weight of from about 5,000 to about 1,000,000.

In one embodiment of the composition of any previous embodiment, the hydroxylated polydiorganosiloxane has a weight average molecular weight of from about 200,000 to about 1,000,000.

In one embodiment of the composition of any previous embodiment, the hydroxylated polydiorganosiloxane is a hydroxyl-terminated polydimethylsiloxane.

In one embodiment of the composition of any previous embodiment, the colloidal silica dispersion comprises silica particles having an average particle size of from about 5 to about 125 nanometers.

In one embodiment of the composition of any previous embodiment, the catalyst comprises a metal compound selected from the group consisting of tin, titanium, zirconium, lead, iron cobalt, antimony, manganese, bismuth, zinc compounds and combinations thereof.

In one embodiment of the composition of any previous embodiment, the emulsion stabilizer is one or more organic amine compounds selected from the group consisting of 2-amino-2-methyl-1-propanol (AMP), 2-amino-1-butanol, 2-amino-2-methyl-1,3-propanediol, 2-amino-2-ethyl-1,3-propanediol, 2-amino-2-hydroxymethyl-1,3-propanediol, N-methyl derivatives of 2-amino-2-hydroxymethyl-1,3-propanediol or N-ethyl derivatives of 2-amino-2-hydroxymethyl-1,3-propanediol N,N-dimethyl derivatives of 2-amino-2-hydroxymethyl-1,3-propanediol, N,N-diethyl derivatives of 2-amino-2-hydroxymethyl-1,3-propanediol and combinations thereof.

In one aspect, the present invention provides a waterborne coating comprising the silicone composition according any previous embodiment.

In one embodiment, waterborne coating is a sealer.

In still another aspect, the present invention provides an article comprising the waterborne coating of any previous embodiment disposed on at least a portion of a surface of the article.

In yet another aspect, the present invention provides a water-borne co-binder silicone-organic resin composition comprising: at least one hydroxylated polydiorganopolysiloxane; at least one colloidal silica dispersion, at least one catalyst, at least one emulsion stabilizer, at least one surfactant, at least one organic resin, and water.

In one embodiment, the water-borne co-binder silicone-organic resin composition is a mixture comprising: (A) a crosslinkable silicone based emulsion comprising the reaction product of (i) the at least one hydroxylated polydiorganopolysiloxane and (ii) the colloidal silica, and (iii) the at least one catalyst, (iv) the at least one emulsion stabilizer, (v) the at least one surfactant, and (vi) water; and (B) an organic resin emulsion comprising water, the at least one surfactant and the at least one organic resin; and optionally (C) an epoxy functional polysiloxane and/or an emulsion of an alkylpolysilsesquioxane.

In one embodiment of the waterborne co-binder silicone-organic resin composition the crosslinkable silicone based emulsion (A) is present in an amount of from about 5 to about 100 parts by weight per 100 parts of the organic resin emulsion (B).

In one embodiment of the waterborne co-binder silicone-organic resin composition according to any previous embodiment, each of the at least one hydroxylated polydiorganosiloxane, the at least one catalyst and the at least one organic resin are emulsions.

In one embodiment of the waterborne co-binder silicone-organic resin the organic resin emulsion (B) is a latex polymer obtainable by emulsion polymerization of at least one ethylenically unsaturated monomer in water, a polyurethane emulsion or dispersion, a polyether emulsion, or an epoxy resin emulsion.

In a further aspect, the present invention provides a process for making the crosslinkable silicone based emulsion (A), the process comprising heating, at a temperature of from about 40° C. to 100° C. for about 1 to about 72 hours, a silicone emulsion composition comprising: (i) at least one hydroxylated polydiorganopolysiloxane, (ii) colloidal silica, (iii) at least one catalyst, (iv) at least one emulsion stabilizer, (v) at least one surfactant, and (vi) water, wherein the at least one hydroxylated polydiorganopolysiloxane and the at least one catalyst are emulsified using the at least one surfactant.

In one embodiment, the composition of any previous embodiment or formed from the process is a coating, adhesive or sealant composition.

In another aspect, the present invention provides a process for making a crosslinkable silicone based emulsion composition comprising: (a) adding a colloidal silica, a catalyst and an emulsion stabilizer to a first emulsion comprising a non-ionically or an anionically stabilized hydroxylated polydiorganosiloxane to form a second emulsion; and (b) heating the second emulsion to a temperature of from about 40° C. to about 100° C.

In one embodiment, the process comprises heating the composition at a temperature of from about 70° C. to about 85° C.

In one embodiment of the process of any previous embodiment, the colloidal silica has an average particle size of from about 5 to about 125 nanometers.

In one embodiment of the process of any previous embodiment, the colloidal silica is present in an amount of from about 1 to about 150 parts by weight of colloidal silica per 100 parts of the hydroxylated polydiorganosiloxane.

In one embodiment of the process of any previous embodiment, the hydroxylated polydiorganosiloxane comprises a hydroxylated polydimethylsiloxane.

In one embodiment of the process of any previous embodiment, the polydiorganosiloxane has a weight average molecular weight of about 5,000 to about 1,000,000.

In yet another aspect, the present invention provides a waterborne co-binder silicone resin composition comprising an organic resin emulsion and the crosslinkable silicone based emulsion made by the process of claim 20.

In one embodiment, the waterborne co-binder silicone resin composition further comprises at least one epoxy functional polysiloxane.

In still another aspect, the present invention provides a film formed from the waterborne co-binder silicone resin composition of any previous embodiment.

These and other aspects and embodiments are further understood with reference to the following detailed description.

DETAILED DESCRIPTION

The present invention generally provides a crosslinkable silicone based emulsion, a method of making such crosslinkable silicone based emulsions, and a waterborne organic resin composition comprising such crosslinkable silicone based emulsions. The crosslinkable silicone based emulsions may be used in waterborne organic resin compositions, specifically latex emulsions, to provide improved properties to the waterborne organic resin. The crosslinkable silicone based emulsions may function as a co-binder for waterborne organic resins, and can provide a waterborne silicone-organic resin based coating, which upon casting and drying, produces a film having good elasticity, water resistance, scratch resistance and other desirable properties.

In one aspect, the present invention provides a waterborne co-binder silicone-organic resin composition comprising (A) a crosslinkable silicone based emulsion comprising the reaction product of (i) a hydroxyl terminated silicone with (ii) a colloidal silica to form a crosslinkable silicone moiety, and (iii) a catalyst, (iv) an emulsion stabilizer (v) surfactant, and (vi) water; and (B) an organic resin emulsion.

Crosslinkable Silicone Based Emulsion

The crosslinkable silicone based emulsion compositions comprise the reaction product of a silicone fluid with a colloidal silica to form a crosslinkable silicone moiety, and water, a surfactant, such as an anionic surfactant, a catalyst, and an emulsion stabilizer.

The silicone fluid may be chosen from a hydroxylated silicone fluid. In an embodiment, suitable hydroxylated silicone fluids are hydroxylated, polydiorganosiloxanes. The hydroxylated polydiorganosiloxanes suitable for use in the present invention include those that can be emulsified and which will impart elastomeric properties when reacted with the colloidal silica and after the removal of the water from the reaction product. The term "hydroxylated polydiorganosiloxane" includes, but is not limited to, polymers that are essentially a linear species of repeating diorganosiloxane units and polymeric species that contain small numbers of monoorganosiloxane units, up to a maximum of about five monoorganosiloxane unit per 100 diorganosiloxane units, more preferably one monoorganosiloxane unit per 100 diorganosiloxane units. The hydroxylated polydiorganosiloxanes may have an average of about two silicon-bonded hydroxyls per molecule up to a number of silicon-bonded hydroxyls that is equal to one silicon-bonded hydroxyl for each monoorganosiloxane in the hydroxylated polydiorganosiloxane molecule plus the two chain terminating silicon-bonded hydroxyls. In embodiments, the hydroxylated polydiorganosiloxane comprises about two silicon-bonded hydroxyls per molecule.

Suitable hydroxylated polydiorganosiloxanes are those which have an elastomeric property when the hydroxylated polydiorganosiloxanes are reacted with the colloidal silica and after the removal of the water from the emulsion. In one embodiment, the hydroxylated polydiorganosiloxane has a weight average molecular weight (Mw) of at least about 5,000, more preferably from about 5,000 to about 1,000,000, even more preferably from about 100,000 to about 1,000,000, yet even more preferably from about 200,000 to about 1,000,000 and still yet more preferably from about 500,000 to about 1,000,000. Hydroxylated polydiorganosiloxanes with low weight average molecular weights may not provide high levels of elongation, specifically greater than about 100 percent elongation, to the elastomeric products, but may be useful for certain coating applications. Tensile strengths and elongations at break improve with increasing molecular weight, with reasonable tensile strengths and elongations obtained above about 30,000 weight average molecular weights and the better tensile strengths and elongations obtained above about 50,000 weight average molecular weights. The maximum weight average molecular weight of the hydroxylated polydiorganosiloxane is one which can be emulsified and which will give elastomeric properties when reacted with the colloidal silica and impart the desired properties to the waterborne co-binder silicone-organic resin composition after the water is removed from the composition. The hydroxylated polydiorganosiloxanes at the higher weight average molecular weights desirably contain some monoorganosiloxane units to increase the silicon-bonded hydroxyl content. In embodiments, the weight average molecular weights for the hydroxylated polydiorganosiloxane containing at least one monoorganosiloxane unit is in the range of about 100,000 to about 1,000,000, more preferably from about 200,000 to about 700,000, even more preferably from about 400,000 to about 600,000.

In another embodiment, the weight average molecular weight for the hydroxylated polydiorganosiloxane, including the hydroxylated polydiorganosiloxane containing at least one monoorganosiloxane unit is determined in accordance with ASTM D5296-11, Standard Test Method for Molecular Weight Averages and Molecular Weight Distribution of Polystyrene by High Performance Size-Exclusion Chromatograph.

In still another embodiment, the hydroxylated polydiorganosiloxane is a compound having the structure of Formula (1):

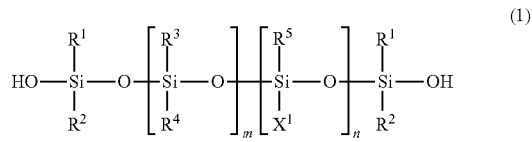

wherein:
each occurrence of $R^1$ and $R^2$ is independently selected from the group consisting of a hydroxyl group, an alkyl group having from 1 to 10 carbon atoms, an alkyl group having from 1 to 10 carbon atoms and substituted with at least one fluoro group, an aryl group having from 6 to 10 carbon atoms, a cycloalkyl group having from 3 to 10 carbon atoms, an alkenyl group containing 2 to 10 carbon atoms and an aralkyl group having from 7 to 12 carbon atoms, more preferably $R^1$ and $R^2$ are independently chosen from methyl, ethyl, or phenyl, and even more preferably methyl;
each occurrence of $R^3$, $R^4$, and $R^5$ is independently selected from the group consisting of an alkyl group having from 1 to 10 carbon atoms, an alkyl group having from 1 to 10 carbon atoms and substituted with at least one fluoro group, an aryl group having from 6 to 10 carbon atoms, a cycloalkyl group having from 3 to 10 carbon atoms, an alkenyl group containing 2 to 10 carbon atoms and an aralkyl group having from 7 to 12 carbon atoms, more preferably each occurrence of $R^3$, $R^4$, and $R^5$ is independently selected from methyl, ethyl, or phenyl, and even more preferably methyl;
each occurrence of $X^1$ is independently a group having the structure of Formula (2):

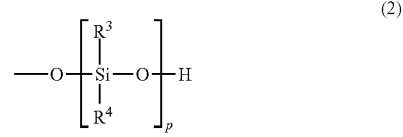

wherein each occurrence of $R^3$ and $R^4$ is independently selected from the group consisting of an alkyl group having from 1 to 10 carbon atoms, an alkyl group having from 1 to 10 carbon atoms and substituted with at least one fluoro group, an aryl group having from 6 to 10 carbon atoms, a cycloalkyl group having from 3 to 10 carbon atoms, an alkenyl group containing 2 to 10 carbon atoms and an aralkyl group having from 7 to 12 carbon atoms, more preferably each occurrence of $R^3$ and $R^4$ in Formula (2) is independently chosen from methyl, ethyl, or phenyl, and even more preferably methyl;
wherein the subscript m, n, and p are integers independently chosen such that the weight average molecular weight of the material has a weight average molecular weight satisfying the values or the ranges described above. In another embodiment, m, n, and p are integers, wherein preferably, m is from about 65 to about 13,500, n is from 0 to about 135, p is from 0 to about 1,000, even more preferably m is from 130 to 10,000, n is from 0 to 13 and p is from 0 to about 100, yet even more preferably m is from about 325 to 2,700, n is from 0 to about 5 and p is from 0 to 10, and yet more preferably, m is from about 650 to 1,350, n is 0 or 1 and p is 0, with the provisos that
(i) the molar ratio of m:n is from 100:0 to 100:5, more preferably, from 100:0 to 100:1 and even more preferably 100:0, and
(ii) the sum of m+n+p is from 65 to 13,500.

The organic groups of the hydroxylated polydiorganosiloxane can be monovalent alkyl groups containing less than seven carbon atoms and 2-(perfluoroalkyl)ethyl groups containing less than seven carbon atoms. Representative and non-limiting alkyl groups include methyl, ethyl, propyl, butyl, isopropyl, pentyl, and hexyl. Representative and non-limiting examples of alkenyl groups include vinyl and allyl. Representative and non-limiting examples of cycloalkyl groups include cyclopentyl, cyclohexyl, cyclooctyl, and cyclodecyl. Representative and non-limiting examples of aryl groups are phenyl and tolyl; and non-limiting examples of aralkyl groups are benzyl or phenethyl. Representative and non-limiting examples of 2-(perfluoroalkyl)ethyl groups include 3,3,3-trifluoropropyl and 2-(perfluorobutyl)ethyl. In still another embodiment, the hydroxylated polydiorganosiloxanes may contain organic groups in which at least 50 mole percent are methyl. In one embodiment, the hydroxylated polydiorganosiloxnes is a hydroxyl-terminated polydimethylsiloxane.

The emulsion of the hydroxylated polydiorganopolysiloxane may be prepared using a non-ionic surfactant, an anionic surfactant, or a combination thereof, in an embodiment, preferably an anionic surfactant. This emulsion of the hydroxylated polydiorganopolysiloxane prepared using anionic surfactants may be referred to as an anionically stabilized silicone fluid. The non-ionic or anionic surfactant may be chosen from any suitable surfactant as may be desired and suitable for the intended purpose. Examples of suitable anionic surfactants include, but are not limited to, carboxylic acid surfactants, sulfuric acid surfactants, sulfonic acid surfactants, phosphoric acid surfactants, salts of such surfactants, or a combination of two or more surfactants thereof.

Representative and non-limiting examples of carboxylic acid surfactants include, for example, a carboxylic acid, such as poly acrylic acid, poly methacrylic acid, poly maleic acid, poly maleic anhydride, a copolymer of maleic acid or maleic anhydride and an olefin, as, for example, ethylene, propylene, isobutylene, diisobutylene, and the like, a copolymer of acrylic acid and itaconic acid, a copolymer of methacrylic acid and itaconic acid, a copolymer of maleic acid or maleic anhydride and styrene, a copolymer of acrylic acid and methacrylic acid, a copolymer of acrylic acid and methyl acrylate ester, a copolymer of acrylic acid and vinyl acetate, a copolymer of acrylic acid and maleic acid or maleic anhydride, a polyoxyethylene alkyl ether acetic acid where the alkyl group has from 4 to 28 carbon atoms, more preferably from 8 to 18 carbon atoms, an N-methyl-fatty acid sarcosinate where the fatty acid has from 4 to 28 carbon atoms, more preferably from 8 to 18 carbon atoms, a resin acid, and a fatty acid having 4 to 28 carbon atoms, more preferably from 8 to 18 carbon atoms, and salts of these carboxylic acids.

Representative and non-limiting examples of sulfuric acid ester surfactants include for example, a sulfuric acid ester, such as an alkyl sulfuric acid ester where the alkyl group has from 4 to 28 carbon atoms, more preferably from 8 to 18 carbon atoms, a polyoxyethylene alkyl ether sulfuric ester where the alkyl group has from 4 to 28 carbon atoms, more preferably from 8 to 18 carbon atoms, a polyoxyethylene mono or di alkyl phenyl ether sulfuric acid ester where the alkyl group has from 4 to 28 carbon atoms, more preferably from 8 to 18 carbon atoms, a sulfuric acid ester of a polymer of a polyoxyethylene mono or di alkyl phenyl ether where the alkyl group has from 4 to 28 carbon atoms, more preferably from 8 to 18 carbon atoms, a polyoxyethylene mono, di, or tri phenyl ether sulfuric acid ester, a polyoxyethylene mono, di, or tri benzyl phenyl ether sulfuric acid ester, a polyoxyethylene mono, di, or tri styryl phenyl ether sulfuric acid ester, a sulfuric acid ester of a polymer of a polyoxyethylene mono, di, or tri styryl phenyl ether, a sulfuric acid ester of a polyoxyethylene polyoxypropylene block polymer, a sulfated oil, a sulfated fatty acid ester, a sulfated fatty acid, and a sulfated olefin and salts of these sulfuric acid esters.

Representative and non-limiting examples of sulfonic acid surfactants include, for example, a sulfonic acid, such as a paraffin sulfonic acid where the paraffin has from 8 to 22 carbon atoms, an alkyl benzene sulfonic acid where the alkyl group has from 4 to 28 carbon atoms, more preferably from 8 to 12 carbon atoms, a formalin condensate of an alkyl benzene sulfonic acid where the alkyl group has from 4 to 28 carbon atoms, more preferably from 8 to 12 carbon atoms, a formalin condensate of a cresol sulfonic acid, an α-olefin sulfonic acid where the alpha-olefin has from 8 to 16 carbon atoms, a dialkyl sulfo succinic acid where the alkyl group has from 4 to 28 carbon atoms, more preferably from 8 to 12 carbon atoms, a lignin sulfonic acid, a polyoxyethylene mono or di alkyl phenyl ether sulfonic acid where the alkyl group has from 4 to 28 carbon atoms, more preferably from 8 to 12 carbon atoms, a polyoxyethylene alkyl ether sulfo succinic acid half ester where the alkyl group has from 4 to 28 carbon atoms, more preferably from 8 to 18 carbon atoms, a naphthalene sulfonic acid, a mono or di alkyl naphthalene sulfonic acid where the alkyl group has from 1 to 12 carbon atoms, more preferably from 1 to 6 carbon atoms, a formalin condensate of a naphthalene sulfonic acid, a formalin condensate of a mono or di alkyl naphthalene sulfonic acid where the alkyl group has from 1 to 12 carbon atoms, more preferably from 1 to 6 carbon atoms, a formalin condensate of a creosote oil sulfonic acid, an alkyl diphenyl ether disulfonic acid where the alkyl group has from 4 to 28 carbon atoms, more preferably from 8 to 12 carbon atoms, Igepon T (product name for sodium N-oleoyl-N-methyltaurate), a polystyrene sulfonic acid, and a copolymer of a styrene sulfonic acid and methacrylic acid, and salts of these sulfonic acids.

Representative and non-limiting examples of phosphoric acid ester surfactants include a phosphoric acid ester, such as an alkyl phosphoric acid ester where the alkyl group has from 4 to 28 carbon atoms, more preferably from 8 to 12 carbon atoms, a polyoxyethylene alkyl ether phosphoric acid ester where the alkyl group has from 4 to 28 carbon atoms, more preferably from 8 to 18 carbon atoms, a polyoxyethylene mono or di alkyl phenyl ether phosphoric acid ester where the alkyl group has from 4 to 28 carbon atoms, more preferably from 8 to 12 carbon atoms, a phosphoric acid ester of a polymer of a polyoxyethylene mono, di, or tri alkyl phenyl ether where the alkyl group has from 4 to 28 carbon atoms, more preferably from 8 to 12 carbon atoms, a polyoxyethylene mono, di, or triphenyl ether phosphoric acid ester, a polyoxyethylene mono, di, or tri benzyl phenyl ether phosphoric acid ester, a polyoxyethylene mono, di, or tri styryl phenyl ether phosphoric acid ester, a phosphoric acid ester of a polymer of a polyoxyethylene mono, di, or tri styryl phenyl ether, a phosphoric acid ester of a polyoxyethylene polyoxypropylene block polymer, phosphatidylcholine, phosphatidyl ethanolimine, and a condensed phosphoric acid, such as, for example, tripoly phosphoric acid, and salts of these phosphoric acid esters.

Salts of the surfactants may comprise the above anionic materials and a counter ion. Suitable counter ions for salts of the anionic surfactants include, but are not limited to, alkaline metals, including lithium, sodium, potassium, and the like, alkaline earth metals, including calcium, magnesium, and the like, ammonium, and a variety of primary, secondary, tertiary and quaternary amines, including for example, an alkylamine, a cycloalkylamine, and an alkanol amine.

Particularly suitable surfactants include, but are not limited to, sulfonic acids. Examples include a salt of the surface active sulfonic acids used in the emulsion polymerization to form the hydroxylated polydiorganosiloxane as shown in U.S. Pat. No. 3,294,725, which is hereby incorporated by reference in its entirety. The alkali metal salts of the sulfonic acids, where the sodium salts are particularly suitable. The sulfonic acid can be illustrated by aliphatically substituted benzenesulfonic acids, aliphatically substituted naphthalene sulfonic acids, aliphatic sulfonic acids silylalkylsulfonic acids and aliphatically substituted diphenylethersulfonic acids.

Representative and non-limiting examples of the nonionic surfactants may include polyoxyethylene alkyl ethers, polyoxyethylene alkyl phenyl ethers, polyoxyethylene fatty acid esters, sorbitan fatty acid esters, and polyoxyethylene sorbitan fatty acid esters.

The amount of surfactant, specifically the anionic emulsifying agent and/or nonionic emulsifying agent, can be less than about 15 weight percent, based on the total weight of the total weight of the emulsion of hydroxylated polydiorganosiloxane, water, and surfactant, more specifically from about 0.1 to about 5 weight percent and even more specifically from about 0.5 to about 2 weight percent, based on the total weight of the emulsion of hydroxylated polydiorganosiloxane, water, and surfactant. This amount can result, for example, from the neutralized sulfonic acid wherein the sulfonic acid is used in the emulsion polymerization method for the preparation of the hydroxylated polydiorganosiloxane. Other anionic emulsifying agents can be used including, but not limited to, alkali metal sulforicinates, sulfonated glyceryl esters of fatty acids, salts of sulfonated monovalent alcohol esters, amides of amino sulfonic acid such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate, and sodium lauryl ether sulfate.

The crosslinkable silicone based emulsion may further comprise colloidal silica. Generally, any colloidal silica can be used. Examples of suitable colloidal silicas include, but are not limited to, fume colloidal silicas and precipitated colloidal silicas. Particularly suitable colloidal silicas are those that are available in an aqueous medium. Colloidal silicas in an aqueous medium are usually available in a stabilized form, such as those stabilized with sodium ion, ammonia, or an aluminum ion. Aqueous colloidal silicas that have been stabilized with sodium ion are particularly useful because the pH requirement can be met by using a sodium ion stabilized colloidal silica without having to add additional ingredients to bring the pH within the range of 9 to 11.5. The colloidal silica may have particle diameters of from 5 to 125 nanometers, more specifically 10 to 100 nanometers and even more specifically from 50 to 85 nanometers. Here as elsewhere in the specification and claims, numerical values may be combined to form new and non-disclosed ranges. Using relatively large colloidal silica particles has been found to provide a composition with excellent shelf life stability.

In one embodiment, the particle diameters for the colloidal silica are determined in accordance with ASTM E2490-09 (2015), Standard Guide for Measurement of Particle Size Distribution of Nanomaterials in Suspension by Photon Correlation Spectroscopy (PCS).

The crosslinkable silicone based emulsion has a continuous water phase in which there is a dispersed phase which comprises an anionically stabilized hydroxylated polydiorganosiloxane, emulsion stabilizer, catalyst, surfactant and colloidal silica. The use of large silica particles has been found to provide a composition with good shelf life and storage stability. In one embodiment, the pH of the crosslinkable silicone based emulsion should be within the range of 7 to 12, more preferably from 9 to 11.5 inclusive, which may also provide or contribute to the shelf life and storage stability of the composition. In another embodiment, the composition has a pH in the range of 10.5 to 11.5.

In one embodiment, the pH of the crosslinked silicone based emulsion is determined in accordance with ASTM E70-07 (2015), Standard Test Method for pH of Aqueous Solutions with the Glass Electrode.

The crosslinkable silicone based emulsion comprises water that is about 20 to about 99 percent by weight of the based on the total weight of the water, hydroxylated polydiorganosiloxane, surfactant, silica, catalyst and emulsion stabilizer of the crosslinkable silicone based emulsion and a dispersed phase comprising the hydroxylated polydiorganosiloxane, colloidal silica, surfactant, catalyst and emulsion stabilizer in an amount of from about 1 to about 80 percent by weight of the based on the total weight of the water, hydroxylated polydiorganosiloxane, surfactant, silica, catalyst and emulsion stabilizer of the crosslinkable silicone based emulsion. In one embodiment, the water is from about 30 to about 90 percent by weight and the dispersed phase is from about 10 to about 70 percent by weight of the based on the total weight of the water, hydroxylated polydiorganosiloxane, surfactant, silica, catalyst, and emulsion stabilizer of the crosslinkable silicone based emulsion. In another embodiment, the water is from about 40 to about 80 percent by weight of the based on the total weight of the water, hydroxylated polydiorganosiloxane, surfactant, silica, catalyst, and emulsion stabilizer of the crosslinkable silicone based emulsion, and the dispersed phase is from about 20 to about 60 percent by weight of the based on the total weight of the water, hydroxylated polydiorganosiloxane, surfactant, silica, catalyst, and emulsion stabilizer of the crosslinkable silicone based emulsion.

The colloidal silica may be present in an amount of from about 1 to about 150 parts by weight of colloidal silica per 100 parts by weight of the hydroxylated polydiorganosiloxane, more preferably from about 10 to about 100 parts by weight of colloidal silica per 100 parts by weight of hydroxylated polydiorganosiloxane, even more preferable from about 25 to about 70 parts by weight of colloidal silica for each 100 parts by weight of hydroxylated polydiorganosiloxane.

The crosslinkable silicone based emulsion comprises an emulsion stabilizer. The emulsion stabilizer is not particularly limited and may be selected as desired for a particular purpose or intended application. In one embodiment, the emulsion stabilizer is chosen from an alkanolamine. Examples of suitable alkanolamines for the emulsion stabilizer include, but are not limited to, 2-amino-2-methyl-1-propanol (AMP), 2-amino-1-butanol, 2-amino-2-methyl-1, 3-propanediol, 2-amino-2-ethyl-1,3-propanediol, 2-amino-2-hydroxymethyl-1,3-propanediol and N-methyl or N-ethyl derivative thereof and N,N-dimethyl or N,N-diethyl derivatives thereof. Also included are the ethanolamines and propanolamines and N-substituted alkyl, specifically methyl or ethyl derivatives thereof. AMP is particularly suitable as the emulsion stabilizer.

The amount of emulsion stabilizer ranges from about 0.1 to about 10 weight percent, more preferably from about 0.5 to about 5 weight percent, even more preferably from about 1 to about 3 weight percent, based on the total weight of the water, hydroxylated polydiorganosiloxane, surfactant, silica, catalyst, and emulsion stabilizer of the crosslinkable silicone based emulsion.

The crosslinkable silicone based emulsion comprises a catalyst. In an embodiment, the catalyst may be emulsified using non-ionic or anionic surfactants. Suitable catalysts include metal and non-metal catalysts. Examples of the metal portion of the metal condensation catalysts useful in the present invention include tin, titanium, zirconium, lead, iron cobalt, antimony, manganese, bismuth and zinc compounds. Other suitable non-limiting examples of catalysts are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_2^{++}$, $UO_2^{++}$, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to about 18 carbon atoms, and reaction products of alcoholates of various metals with carboxylic acids, beta-diketones, and 2-(N, N-dialkylamino)alkanols, such as well-known chelates of titanium obtained by this or equivalent procedures. Further catalysts include organometallic derivatives of tetravalent tin, trivalent and pentavalent As, Sb, and Bi, and metal carbonyls of iron and cobalt; and combinations thereof. In one embodiment, organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dioctyltin dineo-decanoate, dibutyltin-bis(4-methylaminobenzoate), dibutyltindilaurylmercaptide, dibutyltin-bis(6-methylaminocaproate), and the like, and combinations thereof. Similarly, in another embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

Emulsions of the catalyst are prepared using non-ionic or anionic surfactants, water and the catalysts, by methods known in the art. The emulsion of the catalysts comprises from about 0.1 to about 10 weight percent, more preferably from about 1 to about 3 weight percent surfactant and from about 1 to about 75 weight percent, more preferably from about 25 to about 70 weight percent catalyst and the remainder to make up 100 weight percent of the emulsion is water.

In the crosslinkable silicone based emulsion, the amount of catalyst is from about 0.01 to about 10 weight percent, more preferably from about 0.1 to about 5 weight percent and even more preferably from about 1 to about 3 weight percent, based on the total weight of the water, hydroxylated polydiorganosiloxane, surfactant, silica, catalyst and emulsion stabilizer of the crosslinkable silicone based emulsion.

In one embodiment, the crosslinkable silicone based emulsion is prepared by
 (a) providing a first non-ionically or anionically stabilized emulsion of the hydroxylated polydiorganosiloxane;
 (b) adding colloidal silica, emulsion of the catalyst and emulsion stabilizer to the first emulsion of step (a) to form a second emulsion; and
 (c) heating the second emulsion of step (b) to provide for a crosslinkable silicone based emulsion.

The non-ionically or anionically stabilized emulsion of the hydroxylated polydiorganosiloxane may be prepared in any suitable manner. For example, emulsified hydroxylated polydiorganosiloxane may be prepared by emulsion polymerization of a polydiorganocyclosiloxane with an anionic polymerization catalyst to provide a hydroxylated polydiorganosiloxane comprising an anionic surfactant. Other methods of providing an anionically stabilized hydroxylated polydiorganosiloxane comprise emulsifying a hydroxylated polydiorganosiloxane using an anionic surfactant.

The colloidal silica may be added to the non-ionically or anionically stabilized emulsion of the hydroxylated polydiorganosiloxane as a dry powder, an aqueous dispersion, or a combination thereof. In one embodiment, the colloidal silica is added as an aqueous dispersion. In particular, in another embodiment, the colloidal silica is added as a dispersion that is anionically stabilized. The colloidal silica may be anionically stabilized with any suitable surfactant, including those suitable for stabilizing the hydroxylated polydiorganosiloxane.

The second emulsion of non-ionically or anionically stabilized emulsion of the hydroxylated polydiorganosiloxane, emulsion stabilizer, emulsion of the catalyst and colloidal silica is then heated to provide for the crosslinkable silicone based emulsion. The second emulsion is heated at a temperature of from about 40° C. to about 100° C. for about 1 to 72 hours. In another embodiment, the second emulsion is heated at a temperature of from about 65° C. to about 90° C., more specifically from about 70° C. to about 85° C. and even more preferably of about 80° C. for 2 to 24 hours.

It has been found that by heating the crosslinkable silicone based emulsion, under the above-specified conditions, a film with suitable elastic properties will be formed. In particular, it has been found that heating the emulsion as described above provides an emulsion that, upon crosslinking, provides a film with a gel content of about 50 to 100 weight percent, more preferably from 60 to 95 weight percent, and even more preferably form 75 to 90 weight percent, based on the total weight of the film. In one embodiment, the gel content is determined in accordance with ASTM D2765 Determination of Gel Content and Swell Ratio of Crosslinked Ethylene Plastics. If the emulsion of the hydroxylated polydiorganosiloxane and colloidal silica is not subjected to a heat treatment as described above, the resulting emulsion produces a powdery film.

Upon heating the composition, it has unexpectedly been found that after the crosslinkable silicone based emulsion has been cast and the water has been evaporated, a film with elastomeric properties and other desirable properties is formed. Heating the hydroxylated polydiorganosiloxane emulsion in the present of the colloidal silica, emulsion stabilizer and catalysts emulsion may result in the adsorption of the hydroxylated polydiorganosiloxane onto the colloidal silica and/or the reaction of the hydroxyl groups of the hydroxylated polydiorganosiloxane with the hydroxyl groups on the surface of the colloidal silica to form water and a siloxane bond. The resulting crosslinkable silicone moiety provides for elastomeric properties and other desirable properties when the water is removed.

It is understood that not all of the hydroxyl groups of the hydroxylated polydiorganosiloxane have reacted with the hydroxyl groups on the surface of the colloidal silica during the heating process. Residual hydroxyl groups from the hydroxylated polydiorganosiloxane are beneficial in the formation of the elastomer during the removal of the water. In on embodiment, the heating process results in the reaction of from about 0.1 to about 90 mole percent of the hydroxyl group of the hydroxylated polydiorganosiloxane that were present before heating step with the colloidal silica, more specifically, from about 1 to about 50 mole percent of the hydroxyl group of the hydroxylated polydiorganosiloxane that were present before heating step, and even more specifically, from about 5 to about 40 mole percent of the hydroxyl group of the hydroxylated polydiorganosiloxane that were present before heating step.

In one embodiment, the hydroxyl groups on the hydroxylated polydiorganosiloxane before and after heating is determined using $^{29}$Si-NMR spectroscopy.

When the crosslinkable silicone based emulsion is combined with emulsions of organic resins, the combination of the two emulsions provides for a waterborne co-binder silicone-organic resin composition that upon casting and curing, provides for a film with water resistance and gloss retention.

Organic Resin Emulsions

The crosslinkable silicone based emulsion may be used to provide for a waterborne co-binder silicone-organic resin composition. The present crosslinkable silicone based emulsions may function as a co-binder within organic resin systems. The present crosslinkable silicone based emulsions may be used to impart desirable properties to an organic resin. For example, the present crosslinkable silicone based emulsions are used with emulsions of organic resins and may provide an organic resin that can form a uniform, smooth film having desirable properties such as, for example, hydrophobicity, elasticity, etc., or a combination of two or more such properties after casting and drying.

The organic resin is not particularly limited and can be chosen as desired for a particular purpose or intended application. In one embodiment, the organic resin is a waterborne organic resin. In another embodiment, the waterborne organic resin comprises a latex polymer formed by emulsion polymerization of at least one ethylenically unsaturated monomer in water using surfactants and water soluble initiators. Typical ethylenically unsaturated monomers include vinyl monomers, acrylic monomers, acrylate monomers, methacrylic monomers, methacrylate monomers, acid-functional monomers, allylic monomers and acrylamide monomers. For architectural applications, the waterborne organic resin(s) may be formed from vinyl monomers and/or acrylic monomers. Suitable vinyl monomers include vinyl esters, vinyl aromatic hydrocarbons, vinyl aliphatic hydrocarbons, vinyl alkyl ethers, or a mixture of two or more thereof. Examples of vinyl esters that may be used include, but are not limited to, vinyl acetate, vinyl propionate, vinyl laurate, vinyl pivalate, vinyl nonanoate, vinyl decanoate, vinyl neodecanoate, vinyl butyrates, vinyl benzoates, vinyl isopropyl acetates, or a combination or two or more thereof. Examples of vinyl aromatic hydrocarbons that may be used include, but are not limited to, styrene, methyl styrenes and other lower alkyl styrenes, chlorostyrene, vinyl toluene, vinyl naphthalene, divinyl benzene, or a combination of two or more thereof. Examples of vinyl aliphatic hydrocarbons that may be used include, but are not limited to, vinyl chloride and vinylidene chloride as well as alpha olefins such as ethylene, propylene, isobutylene, hexylene and octylene, as well as conjugated dienes such as, but not limited to, 1,3 butadiene, methyl-2-butadiene, 1,3-piperylene, 2,3-dimethyl butadiene, isoprene, cyclohexadiene, cyclopentadiene and dicyclopentadiene. Examples of vinyl alkyl ethers that may be used include, but are not limited to, methyl vinyl ether, isopropyl vinyl ether, n-butyl vinyl ether and isobutyl vinyl ether. Acrylic monomers suitable for use in the present invention include any compounds having acrylic functionality such as, but not limited to, alkyl acrylates, acrylic acids, as well as aromatic derivatives of acrylic acid, acrylamides and acrylonitrile. Methacrylic monomers suitable for use in the present invention include any compounds having methacrylic functionality such as, but not limited to, alkyl methacrylates, methacrylic acids, as well as aromatic derivatives of methacrylic acid and methacrylamides. Typically, the alkyl acrylate monomers (also referred to herein as "alkyl esters of acrylic acid") and methacrylate monomers (also referred to herein as "alkyl esters of methacrylic acid") will have an alkyl group containing from 1 to 12, preferably about 1 to 5, carbon atoms per molecule.

Suitable acrylic monomers include, but are not limited to, methyl acrylate, ethyl acrylate, butyl acrylate, propyl acrylate, 2-ethyl hexyl acrylate, decyl acrylate, isodecyl acrylate and neopentyl acrylate. Aryl acrylate monomers include phenyl acrylate and tolyl acrylate. Aralkyl acrylate monomers include benzyl acrylate and phenethyl acrylate. Cycloalkyl acrylate monomers include cyclohexyl acrylate, isobornyl acrylate, 1-adamatyl acrylate. Various reaction products such as butyl, phenyl, and cresyl glycidyl ethers reacted with acrylic acid, hydroxyl alkyl acrylates, such as hydroxyethyl and hydroxypropyl acrylates, amino acrylates, as well as acrylic acids such as acrylic acid, ethacrylic acid, alpha-chloroacrylic acid, alpha-cycanoacrylic acid, crotonic acid, beta-acryloxy propionic acid, and beta-styryl acrylic acid can be used as monomers.

Suitable methacrylic monomers include, but are not limited to, methyl methacrylate, ethyl methacrylate, butyl methacrylate, propyl methacrylate, 2-ethyl hexyl methacrylate, decyl methacrylate, isodecyl methacrylate and neopentyl methacrylate. Aryl methacrylate monomers include phenyl methacrylate and tolyl methacrylate. Aralkyl methacrylate monomers include benzyl methacrylate and phenethyl methacrylate. Cycloalkyl methacrylate monomers include cyclohexyl methacrylate, isobornyl methacrylate, 1-adamatyl methacrylate. Various reaction products such as butyl, phenyl, and cresyl glycidyl ethers reacted with methacrylic acid, hydroxyl alkyl methacrylates, such as hydroxyethyl and hydroxypropyl methacrylates, amino methacrylates, as well as methacrylic acids such as methacrylic acid, and beta-styryl methacrylic acid can be used as monomers.

The organic resin emulsion may be prepared using any of the well-known free-radical emulsion polymerization techniques used to formulate latex polymers. Polymerization techniques suitable for use herein are taught in U.S. Pat. No. 5,486,576, which is incorporated herein by reference.

In one embodiment, the organic resin emulsion is a latex polymer emulsion. Conventional latex emulsions include those prepared by polymerizing at least one ethylenically unsaturated monomer in water using surfactants and water soluble initiators. Typical ethylenically unsaturated monomers include vinyl monomers, acrylic monomers, allylic monomers, acrylamide monomers and mono- and dicarboxylic unsaturated acids. Suitable vinyl esters include, but are not limited to, vinyl acetate, vinyl propionate, vinyl butyrates, vinyl isopropyl acetates, vinyl neodeconate and similar vinyl esters; vinyl halides include vinyl chloride, vinyl fluoride and vinylidene chloride; vinyl aromatic hydrocarbons include styrene, α-methyl styrene, and similar lower alkyl styrenes. Suitable acrylic monomers include monomers such as lower alkyl esters of acrylic or methacrylic acid having an alkyl ester portion containing between 1 to 12 carbon atoms as well as aromatic derivatives or acrylic and methacrylic acid. Useful acrylic monomers include, but are not limited to, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, and benzyl acrylate and methacrylate.

Other organic resin emulsions useful as a binder include polyurethane emulsions, polyester emulsions and epoxy emulsions.

The organic resin emulsion comprises from about 25 to 99 weight percent water and from about 1 to about 75 weight percent organic resin and surfactant, more preferably from about 30 to about 75 weight percent water and from about 25 to about 70 weight percent organic resin and surfactant, wherein the weight percents are based upon the total weight of the organic resin, surfactant and water.

The waterborne co-binder silicone-organic resin composition comprises a crosslinkable silicone based emulsion, denoted as part A, in an amount of from about 5 to about 100 parts by weight per 100 parts of the organic resin emulsion, denoted as part B, more specifically from about 10 to about 80 parts by weight crosslinkable silicone based emulsion A per 100 parts of organic resin emulsion B, even more specifically from about 20 to about 60 parts by weight crosslinkable silicone based emulsion A per 100 parts of the organic resin B, and yet even more specifically from about 30 to about 50 parts by weight of crosslinkable silicone based emulsion per 100 parts of organic resin B.

The watereborne co-binder silicone-organic resin composition may comprise other components as may be desired for a particular purpose or intended application. Such components may include, but are not limited, fillers, such as, for example, calcium carbonate, talc, mica, barium sulfate, silica, clays or a combination of two or more thereof; pigments, such as titanium; dispersing agents such as, for example, tetrasodium pyrophosphate, poly(acrylic acids) and soya lecithin; wetting agents, such as, for example, silicone polyether copolymer; defoamers such as, for example, acetylenic diols, mineral oils and silicones; plasticizers; associative thickeners for rheology control; waxes; colorants; antioxidants; UV stabilizers; biocides; wet-adhesive emulsion additives; coalescing agents such as, for example, texanol, butyl carbinol, hexylene glycol, ethylene glycol monobutyl ether, adipic, phthalic and benzoic acid esters of propane diol and propylene glycol ether; additives for pH control; epoxy-functional polysiloxanes, or a combination of two or more thereof.

In one embodiment, the watereborne co-binder silicone-organic resin composition further comprises an epoxy-functional polysiloxane. The epoxy-functional polysiloxane has the structure of Formula (3):

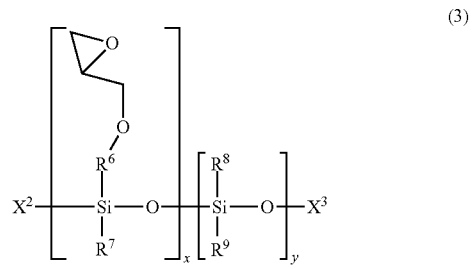

wherein
$X^2$ is an alkyl group having from 1 to 6 carbon atoms, an alkoxy group having 1 to 6 carbon atoms, a hydroxyl-substituted alkoxy group having 2 to 6 carbon atoms or a hydroxyl group, more preferably hydroxyl or methoxy;
$X^3$ is an alkyl group having from 1 to 6 carbon atoms, a hydroxyl-substituted alkyl group having 2 to 6 carbon atoms, a hydrogen or a —$SiR^8$ group, more preferably a hydrogen or methyl;
$R^6$ is an alkylene group containing 2 to 6 carbon atoms, more preferably a propylene group;
$R^7$ is an alkyl group having from 1 to 6 carbon atoms, an alkoxy group having 1 to 6 carbon atoms, a hydroxyl-substituted alkoxy group having 2 to 6 carbon atoms or a hydroxyl group, more preferably hydroxyl or an alkoxy group having 1 to 3 carbon atoms;
$R^8$ is an alkyl group having 1 to 6 carbon atoms, an aryl group having 6 to 10 carbon atoms, an aralkyl group having 7 to 10 carbon atoms or an alkenyl group having 2 to 6 carbon atoms;
$R^9$ is an alkyl group having from 1 to 6 carbon atoms, an alkoxy group having 1 to 6 carbon atoms, a hydroxyl-substituted alkoxy group having 2 to 6 carbon atoms or a hydroxyl group, more preferably hydroxyl or an alkoxy group having 1 to 3 carbon atoms; and
the subscripts x and y are integers, wherein x is from 1 to 20 carbon atoms, more specifically 1 to 6 carbon atoms and y is from 0 to 30, more preferably 0.

The amount of the epoxy-functional polysiloxane added to the waterborne co-binder silicone-organic resin composition is from about 0.1 parts by weight to about 10 parts by weight per 100 parts by weight of the organic resin, more preferably about 0.5 parts by weight to about 5 parts by weight per 100 parts by weight organic resin.

The waterborne co-binder silicone-organic resin composition is prepared by mixing the crosslinkable silicone based emulsion A with the organic resin emulsion B in the amounts described above.

The waterborne co-binder silicone-organic resin composition comprising the crosslinkable silicone based emulsions and organic resin emulsion may be used to provide a film or coating. The coatings of this invention can be applied by spray techniques, brushed onto substrates, applied with fiber-based rollers, applied using roll coating equipment and the like. The substrates to which the coatings of this invention can be applied include wood-based, plasterboard, cement, wallpaper, previously coated surfaces, stucco, leather, plastic-based surfaces, plastic film, paper, cardboard, metal and the like. The coatings are suitable for use in interior applications but exterior applications can also be considered.

The following examples are presented for purposes of illustrating the invention and should not be construed as limiting the scope of the invention which is properly delineated in the claims.

EXAMPLES

Example 1: Crosslinkable Silicone Based Emulsion

A crosslinkable silicone based emulsion was prepared. Into a 2-liter round-bottom 3-necked flask equipped with a mechanical stirrer, J-kem thermal couple and a Friedrich cold water condenser connected to a $N_2$ bubbler, under stirring were charged hydroxyl-terminated polydimethylsiloxane emulsion (400 grams of about 54% non-volatile content, NP-1 emulsion obtained from Momentive Performance Materials, Inc. with a weight average molecular weight of hydroxyl-terminated polydimethylsiloxane 206,000 and a number average molecular weight of 143,000, silica dispersion (600 grams of a 40% colloidal silica, obtained under the trade name Nexsil 125-40 from Nyacol, where the silica particle size was about 85 nanometers), antifoam agent (1 grams of Sag-10 obtained from Momentive Performance Materials, Inc.), 2-amino-2-methyl-1-propanol (20 grams obtained under the trade name AMP 95 from Dow Chemical) and tin catalyst emulsion (50% dioctyltin dineo-decanoate obtained under the trade name SM-2146 from Momentive Performance Materials, Inc.). The stir speed was adjusted to about 400 rpm and the mixture was heated to 80° C. After stirring at 80° C. for 4 hours, the contents were cool to room temperature to yield about 1 kilogram crosslinkable silicone based emulsion.

Example 2: Procedure to Break Silicone Emulsions and to Determine Crosslinked Content of Composition The crosslinkable silicone based emulsion was broken and separated for analysis. The crosslinkable silicone based emulsion (8 oz.) was poured into a wide mouth 1 pound jar. The jar was filled with isopropyl alcohol and agitated with a spatula. The contents of the jar were allowed to stand for 2 minutes to precipitate the dispersed phase of the crosslinkable silicone based emulsion. The aqueous layer containing the isopropyl alcohol and water was decanted off and the precipitate was collected, washed with water, the aqueous phase was decanted to yield a precipitate. The precipitate was poured into a 250 ml flask, sparged with nitrogen and subjected to a vacuum to dry the precipitate.

Following the procedure described above, elastic gels were separated from the crosslinkable silicone based emulsion made by heating at 80° C.

The crosslinkable silicone based emulsion had the properties shown in Table 1.

TABLE 1

| Characteristics of Crosslinkable-Silicone Based Emulsion from Example 1 | |
|---|---|
| Solid content | 45% |
| viscosity (at 25° C., cp) | 20 |
| pH | 11 |
| Gel content(crosslinked) of dry film of the crosslinkable silicone based emulsion | 90% |

Comparative Example A: Mixing the Same Ingredients at Room Temperature

Into a 2-liter round-bottom 3-necked flask equipped with a mechanical stirrer, J-kem thermal couple and a Friedrich cold water condenser connected to a $N_2$ bubbler, under stirring were charged hydroxyl-terminated polydimethylsiloxane emulsion (400 grams of about 54% non-volatile content, NP-1 emulsion obtained from Momentive Performance Materials Inc. with a weight average molecular weight of hydroxyl-terminated polydimethylsiloxane 206,000 and a number average molecular weight of 143,000, silica dispersion (600 grams of a 40% colloidal silica, obtained under the trade name Nexsil 125-40 from Nyacol, where the silica particle size was about 85 nanometers), antifoam agent (1 grams of Sag-10 obtained from Momentive Performance Materials, Inc.), 2-amino-2-methyl-1-propanol (20 grams obtained under the trade name AMP 95 from Dow Chemical) and tin catalyst emulsion (50% dioctyltin dineo-decanoate obtained under the trade name SM-2146 from Momentive Performance Materials Inc.). A silicone emulsion with the same ingredients mixed at room temperature was obtained for comparison.

Following the same procedure to break silicone emulsion as described above, non-elastic powdery silicas and oily silicones were separated from the silicone emulsion with the same ingredients mixed at room temperature.

Example 3: Cured Crosslinkable Silicone Based Emulsion

A cured sheet of crosslinkable silicone based emulsion was prepared for tensile measurement. A 4×8 inch mold was cleaned and treated (sprayed) with A4 mold release (PTFE) and let it dry for 10 minutes. The crosslinked silicone based emulsion (30 grams) was transferred into the mold and dried at room temperature for 7 days. The cured sheet was gently removed from the mold and cut into dog-bone tensile specimens for tensile measurement. The measurement was made in accordance with ASTM D2370-98 (2010) using an Instron 3365 Tensile Tester, model 2519-107 and a crosshead speed of 20 inches per minute. The dimensions of the dog bone die were a length (span) of 4 centimeters and a width of 0.6 centimeters. The thickness of the film after cutting using the dog bone die was determined for each test specimen. The reported values were the average of three measurements.

Physical properties of cured film from crosslinkable silicone based emulsion is presented in Table 2.

TABLE 2

| Cured film from Crosslinkable Silicone Based Emulsion from Example 1 | |
|---|---|
| Tensile (psi) | 540 |
| Elongation (%) | 420 |

TABLE 2-continued

Cured film from Crosslinkable Silicone Based Emulsion from Example 1

| | |
|---|---|
| dry film hardness (shore A) | 38 |
| Elastic recovery (%) | 94 |

Examples 4-6: Acrylic Latex Modified with Crosslinkable Silicone Based Emulsion and Comparative Example B An acrylic latex (obtained under the trade name Encor 2502 from Arkema) was blended with various amounts of the crosslinkable silicone based emulsion from Example 1. Films were prepared from the different waterborne co-binder silicone-organic resin compositions cured at room temperature for 7 days. Comparative Ex. B is the control acrylic latex without any addition of silicone emulsion. Table 3 shows some of the properties of the waterborne co-binder silicone-organic resin compositions compared to those of the latex without any silicone emulsion. The contain angles were measured using a VCA Optima Instrument from AST products Inc. and distilled water. The coefficient of friction was measures on the thin films of waterborne co-binder silicone-organic resin compositions after the water was removed. A Monitor/Slip & Friction Instrument, Model No. 32-06 from Testing Machines Inc. was used to measure the coefficient of friction, where the thin films were wetted with distilled water before the measurement, the slide weight was 200 grams and the speed of the pull was 6 inches per minute.

TABLE 3

Comparative study of blending crosslinkable silicone based emulsion from Example 1 with commercial acrylic latex as co-binder

| | Example # | | | |
|---|---|---|---|---|
| | Comparative Ex. B | Ex. 4 | Ex. 5 | Ex. 6 |
| Latex blending Composition | control latex | control latex + 10 weight % Example 1 | control latex + 20 weight % Example 1 | control latex + 30 weight % Example 1 |
| compatibility & film formation | control uniform smooth film | yes uniform smooth film | yes uniform smooth film | yes uniform smooth film |
| Contact angle (on dry film surface) | 78 | 92 | 96 | 93 |
| COF on dry film static (kinetic) | 0.51 (0.36) | 0.28 (0.21) | 0.15 (0.10) | 0.13 (0.09) |

Examples 7-9: Latex Paint Formulations and Comparative Example C

Latex paint formulations were prepared using acrylic latex with additions of the crosslinkable silicone based emulsion of Example 1 at various concentrations.

Example of an exterior 35% PVC latex paint formulation is shown is Table 4.

TABLE 4

| | Component | Amount, parts |
|---|---|---|
| Grinding phase | water | 66 |
| | Monopropylene Glycol | 33 |
| | Polyacrylate salt, COADIS BR40 | 5 |
| | Foam control agent, Drewplus L-108 | 1 |
| | Titanium oxide pigment, Ti-Pure R902 | 210 |
| | Dry milled crystalline calcium carbonate, Durcal 5 | 140 |
| | Microbiostat preservative, an aqueous solution of 1,2-benzisothiazolin-3-one, Proxel GXL | 10 |
| | Total | 465 |
| Let down | Acrylic latex or blends with crosslinkable silicone based emulsion | 470 |
| | 2,2,4-Trimethyl-1,3-pentanediol monoisobutyrate, Texanol | 12 |
| | Rheology modifier, COAPUR 3020 | 30 |
| | Polyurethane thickener, COADIS XS 71 | 2 |
| | Foam control agent, Drewplus L-108 | 1 |
| | Water | 20 |
| | Total of grinding phase and let down | 1000 |

Properties of the latex paint formulations are shown in Table 5.

TABLE 5

Blending crosslinkable silicone based emulsion with acrylic latex in an exterior paint formulation

| | Example | | | |
|---|---|---|---|---|
| | Comp. Ex. C | Ex. 7 | Ex. 8 | Ex. 9 |
| Latex blends for comparison | Control latex | control latex + 5 weight % crosslinkable silicone based emulsion | control latex + 10 weight % crosslinkable silicone based emulsion | control latex + 30 weight % crosslinkable silicone based emulsion |
| Paint film preparation | Cast paint film 8 mils wet thickness bar and dry film at RT for 7 days before testing | | | |
| Contact angle | 70 | 81 | 82 | 87 |
| COF Static/Kinetic | 0.51/0.35 | 0.41/0.34 | 0.40/0.32 | 0.32/0.26 |

Example 10-12: Latex Paint Formulations Using Crosslinkable Silicone Based Emulsion as the Sole Binder Three paint formulations, Example 10-12 shown in Table 6, were prepared using crosslinkable silicone based emulsion as the sole binder. After overnight equilibration of paints, films were prepared to evaluate different performance properties shown in Table 6. Gloss was measured using BYK micro-TRI-gloss meter for films prepared over white sealed charts from Leneta, and dried for 1 day before measurement. Dirt pickup resistance (DPUR) was tested on films dried for 1 day at room temperature and 4-7 days under exterior exposure. Dried films were stained using a paint brush with slurries of charcoal and iron oxide in water. Stains were dried under room temperature for approximately 1 hour, and then inside oven maintained at 50° C. for approximately 2 hours, after which each sample was washed under running water and gentle rubbing using a soft piece of cloth (fresh cloth piece used for each sample). Similar water flow rates, rubbing pressure, and washing duration was used for each sample. L* value of films were measured using Color-Eye 7000A spectrophotometer at un-stained and stained areas after washing. % DPUR was calculated as $L^*_{stained}/L^*_{unstained} \times 100$, where higher value means higher resistance and 100% is perfect resistance. Elongation at break was measured using Instron 3365 Tensile Tester for free films prepared first on Teflon blocks, dried for a total duration of 7 days at room temperature, and were peeled and flipped after 3 days of drying.

TABLE 6

| | Ingredients/Properties | Example 10 | Example 11 | Example 12 |
|---|---|---|---|---|
| Grinding stage | Water | 7.87 | 18.70 | 27.89 |
| | Emdilith DSP pigment Dispersant | 0.19 | 0.90 | 1.56 |
| | Tergitol 15-S-9 surfactant | 0.03 | 0.00 | 0.11 |
| | TiPure R-706 TiO$_2$ | 5.42 | 17.50 | 10.04 |
| | Omyacarb 2 CaCO3 | — | 9.50 | 10.04 |
| | Omyacarb 5 CaCO3 | — | — | 26.77 |
| | Hydroxyethyl Cellulose | 0.11 | 0.40 | 0.45 |
| | AMP-95 base | 0.05 | 0.20 | 0.22 |
| Letdown stage | Crosslinkable silicone based emulsion | 76.00 | 48.00 | 21.06 |
| | Tergitol 15-S-9 surfactant | — | 0.10 | — |
| | Hydroxyethyl Cellulose (2 wt % solution in water) | 10.50 | — | — |
| | Water | — | 4.70 | 1.85 |
| | Total | 100 | 100 | 100 |
| Performance | Gloss (20°, 60°, 85°) | 2.9, 19.5, 47.4 | 1.4, 4.9, 21.2 | 1.2, 2.1, 1.8 |
| | DPUR % | 91 | 98 | 96 |
| | Elongation % | 598 (~175 µm dry film thickness) | — | — |

Formulations shown in Example 10, 11, and 12, are suitable as interior or exterior paints with satin, flat, and dead-flat sheen/gloss levels, respectively. All three formulations demonstrated excellent DPUR of over 90%, which is typically considered challenging for silicone based paints limiting their use as exterior paints or coatings. The formulation in Example 10 also demonstrated excellent elongation at break of approximately 600%, and is suitable as a high-performance elastomeric wall or roof paint or coating. Elongation and hardness properties (DPUR, scratch resistance, etc.) could be further balanced by optimizing filler type and levels.

Examples 13-17: Adhesion Promoter for Water Based Styrene Acrylic Paints and Comparative Example D Waterborne styrene acrylic paint formulations were prepared using a commercially available one-component paint with additions of the crosslinkable silicone based emulsion of Example 1 (Material B) and an epoxy functional silane oligomer with epoxy equivalent weight of 210 (Material A), available from Momentive Performance Materials as CoatOSil* MP200 silane, an epoxy functional oligomer, at various concentrations. The waterborne styrene acrylic paint, tradename 1-Part Epoxy Concrete & Garage Floor Paint, available form Behr.

Paint formulations were tested for cross-hatch adhesion on smooth concrete substrates before and after heat ageing of the paint samples.

Paint formulations were made by post addition of the Material A, and Material B or the combination thereof to the commercially available paint based on total resin solids. The paint formulations were mixed at high rpm by a mechanical stirrer for 30 min. The paint was then allowed to sit at room temperature for 24 hours in a sealed container. Example concentrations of paint formulations are shown in Table 6, where the remainder of the formulation was the paint.

TABLE 6

| | Comp. Ex. D | Ex. 13 | Ex. 14 | Ex. 15 | Ex. 16 | Ex. 17 |
|---|---|---|---|---|---|---|
| Commercial Control | | 0.5% Material A | 2% Material A | 2% Material B | 4% Material B | 2% Mat. A/ 2% Mat. B |

Concrete substrates were purchased from The Masonry Test Block Co. The concrete substrates were cleaned prior to application of the paint formulations by an acidic commercially available concrete etcher and cleaner. Each concrete substrate was submerged in the cleaning solution for 30 seconds, removed, and sat in a glass plate for 8-10 minutes. The wet concrete substrates were then brushed and rinsed under clean running water for 1-2 minutes in order remove all excess acid and loose sediment. The concrete substrates were allowed to dry at room temperature for 24 hours or until constant weight was observed.

Paint formulations were applied to concrete substrates by either brush or rolling coating techniques using commercially available paint brushes. Coated substrates were normalized by total weight of dry film for each substrate. Coated substrates were allowed to cure at room temperature for a total of 7 days before analysis of adhesion.

Cross-hatch adhesion was measured using ASTM method D3359-09. However, adhesion was quantitated by counting the individual squares that remained on the concrete after 4 tape pulls. Sufficient adhesion between tape and concrete was insured by using a wooden tongue depressor to press down the tape. Each tape pull was rotated by 90 degrees.

To assess the effect of ageing on adhesion of the paint formulations, 50° C. heat ageing for 2 weeks was performed. Paint formulations were sealed in a container and placed in an oven at 50° C. for 2 weeks continuously. The paint was then removed from the oven, stirred, and let sit at room temperature for 24 hours before coating concrete substrates. Aged paint was applied to fresh concrete substrates in the same manner as pre-aged paint formulations. The results can be seen in Table 7.

TABLE 7

| | Comp. Ex. D | Ex. 13 | Ex. 14 | Ex. 15 | Ex. 16 | Ex. 17 |
|---|---|---|---|---|---|---|
| Num. of squares left after 4 tape pulls | Control | 0.5% Material A | 2% Material A | 2% Material B | 4% Material B | 2% Mat. A/2% Mat. B |
| Before Ageing | 58 | 95 | 84 | 60 | 80 | 82 |
| After Ageing | 5 | 17 | 17 | 55 | 27 | 76 |

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims appended hereto.

What is claimed is:

1. A crosslinkable silicone based emulsion composition comprising:
   at least one hydroxylated polydiorganopolysiloxane grafted onto at least one colloidal silica dispersion having an average particle size of greater than 100 nanometers;
   at least one catalyst;
   at least one emulsion stabilizer;
   at least one surfactant; and
   water,
   wherein the at least one hydroxylated polydiorganopolysiloxane grafted onto the at least one colloidal silica dispersion contains residual silanol groups from the at least one hydroxylated polydiorganopolysiloxane.

2. The composition of claim 1 further comprising at least one organic resin.

3. The composition of claim 1 wherein the at least one surfactant is a non-ionic surfactant, an anionic surfactant or a combination thereof.

4. The composition according to claim 1, wherein the hydroxylated polydiorganosiloxane has a weight average molecular weight of from about 5,000 to about 1,000,000.

5. The composition according to claim 1, wherein the hydroxylated polydiorganosiloxane has a weight average molecular weight of from about 200,000 to about 1,000,000.

6. The composition of claim 1, wherein the hydroxylated polydiorganosiloxane is a hydroxyl-terminated polydimethylsiloxane.

7. The silicone composition according to claim 1, wherein the colloidal silica dispersion comprises silica particles having an average particle size of greater than 100 nanometers and less than or equal to about 125 nanometers.

8. The composition according to claim 1, wherein the catalyst comprises a metal compound selected from the group consisting of tin, titanium, zirconium, lead, iron cobalt, antimony, manganese, bismuth, zinc compounds and combinations thereof.

9. A crosslinkable silicone based emulsion composition comprising:
   at least one hydroxylated polydiorganopolysiloxane grafted onto at least one colloidal silica dispersion;
   at least one catalyst;
   at least one emulsion stabilizer which is one or more organic amine compounds selected from the group consisting of 2-amino-2-methyl-1-propanol (AMP), 2-amino-1-butanol, 2-amino-2-methyl-1,3-propanediol, 2-amino-2-ethyl-1,3-propanediol, 2-amino-2-hydroxymethyl-1,3-propanediol, N-methyl derivatives of 2-amino-2-hydroxymethyl-1,3-propanediol, N-ethyl derivatives of 2-amino-2-hydroxymethyl-1,3-propanediol, N,N-dimethyl derivatives of 2-amino-2-hydroxymethyl-1,3-propanediol, N,N-diethyl derivatives of 2-amino-2-hydroxymethyl-1,3-propanediol and combinations thereof;
   at least one surfactant; and
   water, wherein the at least one hydroxylated polydiorganopolysiloxane grafted onto the at least one colloidal silica dispersion contains residual silanol groups from the at least one hydroxylated polydiorganopolysiloxane.

10. A water-borne co-binder silicone-organic resin composition comprising:
    i) at least one hydroxylated polydiorganopolysiloxane;
    ii) at least one colloidal silica dispersion having an average particle size of greater than 100 nanometers,
    iii) at least one catalyst,
    iv) at least one emulsion stabilizer,
    v) at least one surfactant,
    vi) at least one organic resin, and
    vii) water,
    wherein the at least one hydroxylated polydiorganopolysiloxane is grafted onto the at least one colloidal silica dispersion to form a reaction product which contains residual silanol groups from the at least one hydroxylated polydiorganopolysiloxane.

11. The water-borne co-binder silicone-organic resin composition of claim 10 wherein the composition is a mixture comprising:
    (A) a crosslinkable silicone based emulsion comprising the reaction product of (i) the at least one hydroxylated polydiorganopolysiloxane and (ii) the colloidal silica dispersion having an average particle size of greater than 100 nanometers, and
    (i) the at least one catalyst,
    (ii) the at least one emulsion stabilizer,
    (iii) the at least one surfactant, and
    (iv) water,
    wherein the reaction product of the at least one hydroxylated polydiorganopolysiloxane grafted onto the at least one colloidal silica dispersion contains residual silanol groups from the at least one hydroxylated polydiorganopolysiloxane; and
    (B) an organic resin emulsion comprising water, the at least one surfactant and the at least one organic resin; and
    optionally (C) an epoxy functional polysiloxane and/or an emulsion of an alkylpolysilsesquioxane.

12. The waterborne co-binder silicone-organic resin composition according to claim 11, wherein the crosslinkable silicone based emulsion (A) is present in an amount of from about 5 to about 100 parts by weight per 100 parts of the organic resin emulsion (B).

13. The waterborne co-binder silicone-organic resin composition according to claim 11, wherein the organic resin emulsion (B) is a latex polymer obtainable by emulsion polymerization of at least one ethylenically unsaturated monomer in water, a polyurethane emulsion or dispersion, a polyether emulsion, or an epoxy resin emulsion.

14. The waterborne co-binder silicone-organic resin composition according to claim 10, wherein each of the at least one hydroxylated polydiorganosiloxane, the at least one catalyst and the at least one organic resin are emulsions.

15. A water-borne co-binder silicone-organic resin composition comprising:
    (A) a crosslinkable silicone based emulsion comprising the reaction product of (i) at least one hydroxylated polydiorganopolysiloxane and (ii) colloidal silica having a particle size of greater than 100 nanometers, and
    (iii) at least one catalyst,
    (iv) at least one emulsion stabilizer,
    (v) at least one surfactant, and
    (vi) water,
    wherein the reaction product of (i) and (ii) is formed by heating at a temperature of from about 40° C. to 100° C. for about 1 to about 72 hours the mixture of components (i) to (vi) and wherein the at least one hydroxylated polydiorganopolysiloxane (i) and the at least one catalyst (iii) are emulsified using the at least one surfactant (v); and (B) an organic resin emulsion comprising water, at least one surfactant and the at least one organic resin,
wherein said water-borne co-binder silicone-organic resin composition is a coating, adhesive or sealant composition.

16. A waterborne co-binder silicone resin composition comprising an organic resin emulsion and a crosslinkable silicone based emulsion made by the process comprising:
   (a) adding a colloidal silica dispersion having an average particle size greater than 100 nanometers, a catalyst, and an emulsion stabilizer to a first emulsion comprising a non-ionically or an anionically stabilized hydroxylated polydiorganosiloxane to form a second emulsion; and
   (b) heating the second emulsion to a temperature of from about 40° C. to about 100° C. to form a reaction product of the at least one hydroxylated polydiorganopolysiloxane grafted onto the at least one colloidal silica dispersion which contains residual silanol groups from the at least one hydroxylated polydiorganopolysiloxane.

17. A waterborne co-binder silicone resin composition comprising an organic resin emulsion, at least one epoxy functional polysiloxane and a crosslinkable silicone based emulsion made by a process comprising:
   (a) adding a colloidal silica dispersion, a catalyst and an emulsion stabilizer to a first emulsion comprising a non-ionically or an anionically stabilized hydroxylated polydiorganosiloxane to form a second emulsion; and
   (b) heating the second emulsion to a temperature of from about 40° C. to about 100° C. to form a reaction product of the at least one hydroxylated polydiorganopolysiloxane grafted onto the at least one colloidal silica dispersion which contains residual silanol groups from the at least one hydroxylated polydiorganopolysiloxane.

18. A process for making a crosslinkable silicone based emulsion composition comprising:
   (a) adding a colloidal silica having a particle size of greater than 100 nanometers, a catalyst and an emulsion stabilizer to a first emulsion comprising a non-ionically or an anionically stabilized hydroxylated polydiorganosiloxane to form a second emulsion; and
   (b) heating the second emulsion to a temperature of from about 40° C. to about 100° C.,
to form a reaction product of the at least one hydroxylated polydiorganopolysiloxane grafted onto the at least one colloidal silica dispersion which contains residual silanol groups from the at least one hydroxylated polydiorganopolysiloxane.

19. The process of claim 18 comprising heating the composition at a temperature of from about 70° C. to about 85° C.

20. The process of claim 18, wherein the colloidal silica dispersion has an average particle size of greater than 100 nanometer to less than or equal to about 125 nanometers.

21. The process of claim 18, wherein the colloidal silica is present in an amount of from about 1 to about 150 parts by weight of colloidal silica per 100 parts of the hydroxylated polydiorganosiloxane.

22. The process of claim 18, wherein the hydroxylated polydiorganosiloxane comprises a hydroxylated polydimethylsiloxane.

23. The process of claim 22, wherein the polydiorganosiloxane has a weight average molecular weight of about 5,000 to about 1,000,000.

24. A process for making the crosslinkable silicone based emulsion (A) according to claim 11 comprising heating at a temperature of from about 40° C. to 100° C. for about 1 to about 72 hours a silicone emulsion composition comprising:
   (i) at least one hydroxylated polydiorganopolysiloxane,
   (ii) colloidal silica having a particle size of greater than 100 nanometers,
   (iii) at least one catalyst,
   (iv) at least one emulsion stabilizer,
   (v) at least one surfactant, and
   (vi) water,
   wherein the at least one hydroxylated polydiorganopolysiloxane and the at least one catalyst are emulsified using the at least one surfactant and wherein reaction products are formed from the grafting of the at least one hydroxylated polydiorganopolysiloxane onto the at least one colloidal silica dispersion and said reaction products contains residual silanol groups from the at least one hydroxylated polydiorganopolysiloxane.

25. A waterborne coating comprising the silicone composition according to claim 1.

26. The waterborne coating of claim 25, wherein the coating is a sealer.

27. An article comprising the waterborne coating of claim 25 disposed on at least a portion of a surface of the article.

28. A film formed from the composition of claim 16.

* * * * *